July 4, 1950 H. SOHON 2,513,528
OMNIDIRECTIONAL RADIO RANGE
Filed March 8, 1946
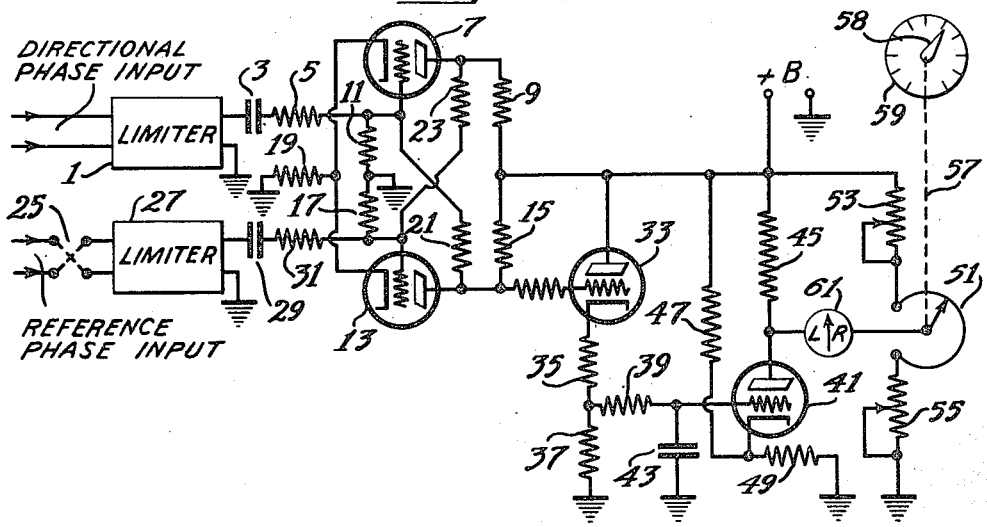
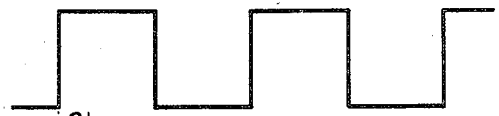
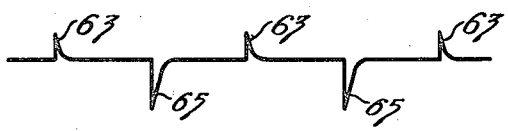
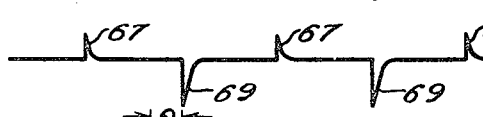
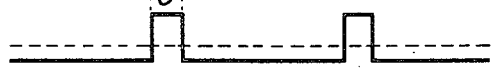
INVENTOR.
Harry Sohon
BY
ATTORNEY.

Patented July 4, 1950

2,513,528

UNITED STATES PATENT OFFICE 2,513,528

OMNIDIRECTIONAL RADIO RANGE

Harry Sohon, Havertown, Pa., assignor to Radio Corporation of America, a corporation of Delaware Application March 8, 1946, Serial No. 652,920

3 Claims. (Cl. 343—102)

1

This invention relates to improvements in radio aids to the navigation of aircraft, and more particularly to course indicator systems for use with omnidirectional radio ranges.

In general, the omnidirectional range radiates two signals: one which varies in some characteristic, such as phase, in accordance with the bearing from the range, and another which does not vary, but serves as a reference for comparison with the first. The range signals are received on the aircraft, where they are compared with each other to provide direct indication of the bearing of the craft from the range station. A typical omnidirectional range system is described in U. S. Patent No. 2,253,958.

For flight along a radial line through the range station, it is desirable to have an indicator of the familiar "left-right" type to show any deviation of the craft from the desired course. Such indicator systems have been devised for use with omnidirectional ranges. Ordinarily they include an adjustable phase shifter for setting the phase of the reference signal to correspond with the bearing of the desired course, and a phase comparison circuit or wattmeter device with a zero center indicator meter. As long as the aircraft is on the selected course line, the meter reads zero. When the craft is off course to the left or right, the meter is deflected accordingly.

Prior art systems of the described type require adjustable phase shifters of high precision, which are costly. Moreover, they inherently introduce a troublesome ambiguity in the course indications, because reciprocal settings i. e. 180° apart, are not distinguished. Thus, the phase comparison circuit will act the same when the course selector is set for 270° as when it is set for 90°.

Copending U. S. patent application Serial No. 647,599 filed February 14, 1946 by Samuel Gubin and entitled Omnidirectional Radio Ranges, describes and claims a course indicator system requiring no adjustable phase shifters and not subject to ambiguity. Said system operates by converting the reference and directional signals to pulse trains, which actuate a pulse interval timer circuit to provide a current proportional to bearing. This current is compared with an adjustable bias to provide left-right indications, the bias being adjusted in accordance with the particular course to be followed.

The present invention deals with improvements over said Gubin system. The principal objects of this invention are to provide a system of the described type including means for preventing inaccuracies resulting from reaction of the bearing selector on the trigger circuit, and simplified means for preventing violent fluctuations of the indicator at or near the zero—360 degree course.

Another object of the instant invention is to provide, in a system of the described type, means for making calibration adjustments of the equipment, such as may be required from time to time and particularly upon installation.

A further object is to provide, in a system of the described type, simple and reliable means for preventing false operation of the trigger circuit.

The foregoing and other objects will become apparent to those skilled in the art upon consideration of the following description, with reference to the accompanying drawing, wherein:

Figure 1 is a schematic circuit diagram of a portion of a bearing indicator system embodying the present invention, and Figures 2, 3, 4, 5 and 6 are oscillograms illustrating the operation of the system of Figure 1.

For illustrating the present invention, an omnidirectional range of the type described in the aforementioned Patent No. 2,253,958 is assumed. It is sufficient for the present explanation to state that the beacon radiates a single carrier with variable phase modulation of one frequency $a$ and a sub-carrier modulation of frequency $\beta$ modulated in turn with a constant phase signal of frequency $a$.

The aircraft carries a receiver including filters and demodulators for separating the modulation components to provide two outputs of frequency $a$; one of constant phase, and one whose phase differs from the constant phase signal by an amount depending upon the bearing of the aircraft from the range beacon.

Referring to Figure 1, the variable or directional phase signal is applied to an amplitude limiter 1. The output circuit of the limiter 1 is coupled by means of a differentiating circuit, consisting of a small capacitor 3 and resistors 5 and 11, to the control grid of an electron discharge tube 7. The tube 7 is provided with a load resistor 9 and a grid leak 11. A similar tube 13 is likewise provided with a load resistor 15 and a grid leak 17. A common self bias resistor 19 is provided in the cathode circuits of both tubes 7 and 13. The anode of the tube 7 is coupled to the control grid of the tube 13 through a resistor 23, and the anode of the tube 13 is coupled to the grid of the tube 7 through a resistor 21. The tubes 7 and 13, with their associated resistors, comprise a so-called "trigger" circuit of the well known Eccles-Jordan type.

The constant or reference phase signal is applied through a reversing switch 25 to a limiter circuit 27, whose output is applied by means of a differentiating circuit, consisting of a small capacitor 29 and resistors 31 and 17, to the control grid of the tube 13.

The anode of the tube 13 is coupled conductively to the control grid of a tube 33. The tube 33 is connected as a cathode follower, with its entire load resistance comprising resistors 35 and 37 in its cathode circuit, and its anode connected directly to the anode supply source B+. The output of the cathode follower appears across the resistors 35 and 37; the part across the resistor 37 is applied through a resistor 39 to the control grid of a further tube 41. A capacitor 43 is connected from the grid of the tube 41 to ground, and together with the resistor 39 serves to integrate or smooth out pulsations in the output of the cathode follower.

The tube 41 is provided with a load resistor 45. Resistors 47 and 49, connected from the cathode to B+ and ground respectively, provided grid-to-cathode bias for the tube 41.

An adjustable voltage divider 51 is connected to B+ and ground through adjustable resistors 53 and 55 respectively. The control shaft 57 of the voltage divider 51 is provided with a pointer 58 and a cooperating scale 59. The scale 59 is calibrated in terms of bearing angle, such as degrees. A zero-center galvanometer type meter 61 is connected between the anode of the tube 41 and the tap of the voltage divider 51. The meter 61 is marked L—R like the conventional left-right radio compass indicator.

The operation and adjustment of the system of Figure 1 are as follows: The constant phase reference signal is applied to the limiter 27, which amplifies and limits it to produce a constant-phase square wave voltage, shown in Figure 2. The reactance of the capacitor 29 at the modulation frequency $a$ is much higher than the combined reactance of the resistors 17 and 31, causing differentiation of the square wave. The resulting voltage at the grid of the tube 13 is shown in Figure 4, and comprises a positive pulse 63 at the beginning of each square wave and a negative pulse 65 at the end of each square wave.

It is found that the amplitudes of the pulses 63 and 65 are not equal, probably owing to variations in the internal resistance of the limiter 27 during the modulation cycle. In the present description, it is assumed that the negative pulses 65 are of greater amplitude than the positive pulses 63, although it is possible that the circuits could be designed to make the positive pulses larger. For example, rectifier means may be provided in the limiter output circuits to eliminate either the positive or the negative pulses. In either case, the operation of the remainder of the system is substantially the same.

The resistors 17 and 31 are proportioned to reduce the amplitudes of both pulses 63 and 65 at the grid of the tube 13 to such an extent that the smaller pulses (63 in this case) are of insufficient amplitude to effect operation of the trigger circuit.

The variable phase directional signal is applied to the limiter 1, which provides a square wave output shown in Figure 3. This lags the output of the limiter 27 by an angle $\theta$, which is the phase angle between the reference and directional input signals and is proportional to the bearing of the aircraft station from the range beacon.

The capacitor 3 and the resistors 5 and 11 are proportioned like the corresponding elements 29, 31 and 17 associated with the limiter 27, and they differentiate the directional phase square wave to provide positive pulses 67 (Figure 5) and negative pulses 69 at the grid of the tube 7.

Each pulse 65 reduces the voltage at the control grid of tube 13 and cuts it off. This causes the voltage on the anode of tube 13 to rise because of the reduced resistance drop in resistor 15. The rise of voltage of the anode of tube 13 causes the voltage on the control grid of tube 7 to rise because of the voltage divider circuit made up of resistors 21 and 11. This therefore initiates conduction in tube 7. This condition continues until the next subsequent negative pulse 69 reaches tube 7 and is amplified in that tube to initiate conduction in tube 13 and thereby cut off tube 7. The cycle of operation recurs with each cycle of the reference and directional signals, causing repeated positive pulses in the voltage at the anode of the tube 13. As shown in Figure 6, each of these pulses has a duration proportional to $\theta$.

The entire output of the cathode follower tube 33 appears across its load resistors 35 and 37, and is substantially equal at all times to the voltage between the anode of the tube 13 and ground. The resistors 35 and 37 act as a voltage divider, applying a portion of the cathode follower output through the resistor 39 to the tube 41.

The capacitor 43 has a reactance, at the modulation frequency $a$, much lower than the resistance of the resistor 39, and thus integrates the voltage pulsations to provide a substantially steady voltage at the tube 41. The magnitude of this voltage is proportional to the average voltage at the anode of the tube 13, and hence is greater than some predetermined constant voltage E by an amount proportional to $\theta$. The value of E depends upon the ratio of the resistors 47 and 49 and the anode supply voltage $E_b$.

The anode current of the tube 41 is a substantially linear function of the input voltage, and the voltage $E_d$ at the anode of the tube 41 is therefore linearly related to the angle $\theta$:

$$E_d = C_1 + k_1\theta$$

where $C_1$ and $k_1$ are constants depending upon the characteristics of the tube 41 and its associated circuit elements. The voltage $E_f$ at the tap of the voltage divider 51 depends upon the adjustment of the shaft 57:

$$E_f = C_2 + k_2\theta$$

where $C_2$ and $k_2$ each depend upon the resistances of both of the resistors 53 and 55, and $\theta$ is the angular position of the shaft 57 as indicated on the dial 59.

Increasing the values of both resistors 53 and 55 together will decrease $k_2$ without substantially changing $C_2$; increasing one of resistors 53 and 55 while decreasing the other a like amount will change $C_2$ without changing $k_2$. Thus the resistors 53 and 55 may be adjusted to make $$C_1 = C_2$$

and $$k_1 = k_2$$

The voltage across the meter 61 is $E_d - E_f$. When the shaft 57 is adjusted to the bearing angle $\theta$, $E_f = E_d$ and the meter 61 is undeflected. If the aircraft goes off to the left or right of the course bearing $\theta$ with respect to the range station, $E_d$ changes and the meter is deflected correspondingly. Thus by setting the shaft 57 to the bearing of any desired course, the craft may be kept on the course by flying so as to keep the meter 61 undeflected. It will be apparent that the equipment can be used also as a direction finder, by rotating the shaft 57 to make the meter 61 indicate zero, and noting the angle on the scale 59.

At course bearings in the zero or 360 degree region, the pulses 63 applied to the tube 13 will substantially coincide with the pulses 67 reaching the tube 7. This tends to cause violent swinging in the indication of the meter 61, since the trigger circuit may select either of its stable conditions, remaining first in one and then in the other for periods of several cycles. To avoid this phenomenon, the reversing switch 25 is operated, in effect shifting the phase of the reference signal 180°. The equipment is then operated as described above, except that the shaft 57 is adjusted to a position differing by an angle of 180° from what it would have if the reversing switch were not used. If no provisions were made the pointer attached to shaft 57 would indicate the reciprocal bearing, i. e., a bearing differing by 180° from the true bearing. Two pointers may be attached to the shaft 57, 180° apart, and colored distinctively (e. g. black and white), or other known expedients may be employed to indicate true bearing with either position of the switch 25.

The amplitude of the output of the trigger tube 13 depends among other things upon the impedance of the load presented to its anode. Small variations in load will cause substantial changes in the average value of the trigger output and consequent error in operation of the system. Such variations in load are introduced if the meter 61 is connected directly to the trigger circuit. The cathode follower 23 presents a constant and very high impedance to the trigger tube 13. This impedance is independent of the load on the cathode follower, so that adjustments of the resistors in the meter circuit do not react on the trigger circuit.

The invention has been described as an improved course indicator system for omnidirectional radio ranges. Reference and directional range signals are converted to pulse trains and applied to a pulse interval timer circuit of the "trigger" type, providing a pulsating output whose average amplitude is a function of the bearing. This output is integrated and compared in a center-zero galvanometer with an adjustable D.-C. voltage, to show deviation from a selected course. Several means are provided for preventing false or erroneous operation of the trigger circuit and for securing stability of indication. Convenient adjustment of calibration is enabled by a simple network of adjustable resistors operating with direct circuits, rather than the phase shifters ordinarily used in omnidirectional range indicators.

I claim as my invention:

1. In a bearing indicator for omnidirectional radio range systems of the type which provide a reference phase signal and a directional phase signal, means for converting said signals to respective trains of pulses, pulse interval timer means responsive alternately to successive pulses of said trains to provide a pulsating output whose average magnitude is normally proportional to the phase difference between said two signals except when said difference is approximately zero or 360 degrees, whereupon said average magnitude is unstable; means for selectively reversing the phase of one of said signals to avoid operation of said pulse interval timer means with said zero or 360 degree phase relationship; a left-right indicator meter connected to said interval timer and responsive substantially to said average value of the output thereof, means, including a resistive element and a tap engaging it, for biassing said meter adjustably by movements of said tap along a path of engagement with the resistive element to produce zero deflection with a predetermined average value of said output, and means for indicating the adjustment of said biassing means in terms of bearing angle according to the position of the tap along said path of engagement, said means for biasing including calibrating means adjustable both to control the value of the bias provided for a given position of said tap and the amount of bias change which is produced by moving said tap along said path of engagement over a given portion thereof.

2. A course indicator for omnidirectional radio range systems which provide a reference phase signal and a directional phase signal, including means for converting said signals to respective trains of pulses, a trigger circuit and means for applying said pulse trains to respective input points of said trigger circuit to produce output therefrom cyclically during intervals corresponding in length to the phase difference between said reference and directional signals; a cathode follower circuit including an electron discharge tube having at least an anode, a control grid, and a cathode, a load resistor, a source of anode voltage connected directly to said anode and through said load resistor to said cathode, and means for applying said output of said trigger circuit to said control grid; amplifier means including an input circuit and an output circuit, means connecting said input circuit to said load resistor of said cathode follower, a galvanometer connected to the output circuit of said amplifier means, means for adjustably biassing said meter, and means for indicating in terms of azimuth the adjustment of said biassing means.

3. A course indicator for omnidirectional radio range systems of the type which provide a reference phase signal and a directional phase signal, including means for converting said signals to respective trains of pulses, a trigger circuit, means for applying said pulse trains to respective input points of said trigger circuit to produce output therefrom cyclically during intervals corresponding in length to the phase difference between said reference and directional signals; an amplifier, means for applying said output of said trigger circuit to said amplifier to produce an output similar to said output of said trigger circuit, an integrating circuit connected to said amplifier to convert said last-mentioned output to a substantially steady direct current; a galvanometer, means for applying said current to said meter, means providing an adjustable bias of said meter, and means for indicating the amount of said bias in terms of azimuth.

HARRY SOHON.

REFERENCES CITED

The following references are of record in the file of this patent:

UNITED STATES PATENTS

| Number | Name | Date |
|---|---|---|
| 1,968,068 | Blancard | July 31, 1934 |
| 2,226,459 | Bingley | Dec. 24, 1940 |
| 2,253,958 | Luck | Aug. 26, 1941 |
| 2,329,504 | Young | Sept. 14, 1943 |
| 2,370,692 | Shepherd | Mar. 6, 1945 |
| 2,391,411 | Goble | Dec. 25, 1945 |
| 2,403,527 | Hershberger | July 9, 1946 |
| 2,404,527 | Potapenko | July 23, 1946 |
| 2,406,970 | Smith | Sept. 3, 1946 |